(12) United States Patent
Isomura et al.

(10) Patent No.: US 10,465,080 B2
(45) Date of Patent: Nov. 5, 2019

(54) WATER-DISPERSED ELECTRODEPOSITION SOLUTION FOR FORMING INSULATING FILM

(71) Applicant: MITSUBISHI MATERIALS CORPORATION, Tokyo (JP)

(72) Inventors: Jyunko Isomura, Naka (JP); Hideaki Sakurai, Naka-gun (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 2 days.

(21) Appl. No.: 15/739,917

(22) PCT Filed: Jun. 21, 2016

(86) PCT No.: PCT/JP2016/068367
§ 371 (c)(1),
(2) Date: Dec. 26, 2017

(87) PCT Pub. No.: WO2017/002666
PCT Pub. Date: Jan. 5, 2017

(65) Prior Publication Data
US 2018/0187028 A1 Jul. 5, 2018

(30) Foreign Application Priority Data

Jul. 2, 2015 (JP) ................... 2015-133394
Jun. 10, 2016 (JP) ................... 2016-115966

(51) Int. Cl.
*C25D 9/02* (2006.01)
*C25D 13/06* (2006.01)
(Continued)

(52) U.S. Cl.
CPC ......... *C09D 5/4461* (2013.01); *C08G 73/105* (2013.01); *C08G 73/1071* (2013.01);
(Continued)

(58) Field of Classification Search
CPC ................... C25D 13/06; C25D 9/02
(Continued)

(56) References Cited

U.S. PATENT DOCUMENTS 3,179,631 A 4/1965 Laszlo
3,846,269 A * 11/1974 Martello et al. ...... C09D 5/4461
428/425.8
(Continued)

FOREIGN PATENT DOCUMENTS

CN 103980528 A 8/2014
GB 1434596 A 5/1976
(Continued)

OTHER PUBLICATIONS

Katsuya Asao, "Development and Application Polyimide Particle", *Journal of the Adhesion Society of Japan*, Dec. 1, 2009, pp. 488 to 492, vol. 45, No. 12 (See attached ISR (Cite No. CB) for relevancy.).

(Continued)

*Primary Examiner* — Brian W Cohen
(74) *Attorney, Agent, or Firm* — Leason Ellis LLP

(57) ABSTRACT

A water-based electrodeposition dispersion for forming an insulating film includes: polymer particles; an organic solvent; a basic compound; and water, wherein the polymer particles include polyamic acid having a predetermined structural unit, and a volume-based median diameter ($D_{50}$) of the polymer particles is 0.08 μm to 0.7 μm.

6 Claims, 1 Drawing Sheet

(51) Int. Cl.
*C09D 5/44* (2006.01)
*C08L 79/08* (2006.01)
*C09D 179/08* (2006.01)
*C08G 73/10* (2006.01)
*C08G 73/14* (2006.01)

(52) U.S. Cl.
CPC ............. *C08G 73/14* (2013.01); *C08L 79/08* (2013.01); *C09D 179/08* (2013.01); *C25D 9/02* (2013.01); *C25D 13/06* (2013.01)

(58) Field of Classification Search
USPC .......................................................... 205/17
See application file for complete search history.

(56) References Cited

U.S. PATENT DOCUMENTS

| | | | |
|---|---|---|---|
| 3,855,169 A | 12/1974 | Lupinski et al. | |
| 4,053,444 A * | 10/1977 | Phillips | C08G 73/1007 204/493 |
| 4,533,448 A | 8/1985 | Scala et al. | |
| 6,187,899 B1 | 2/2001 | Asao et al. | |
| 2010/0108533 A1 | 5/2010 | Fujii et al. | |
| 2010/0279095 A1* | 11/2010 | Li | B82Y 30/00 428/220 |

FOREIGN PATENT DOCUMENTS

| | | |
|---|---|---|
| JP | 48-016331 B | 5/1973 |
| JP | 49-021426 A | 2/1974 |
| JP | 49-052252 A | 5/1974 |
| JP | 11-140181 A | 5/1999 |
| JP | 5513109 B | 6/2014 |

OTHER PUBLICATIONS

International Search Report dated Sep. 13, 2016 for the corresponding PCT Application No. PCT/JP2016/068367.
Wang Yan et al, "The Influence of Technological Conditions on Synthesis of Polyamide Acid" *Guangzhou Chemical Industry*, Aug. 8, 2012, pp. 76-78, vol. 40, No. 15.
Chinese Office Action dated Sep. 3, 2019 for the corresponding Chinese Patent Application No. 201680037591.7.

* cited by examiner

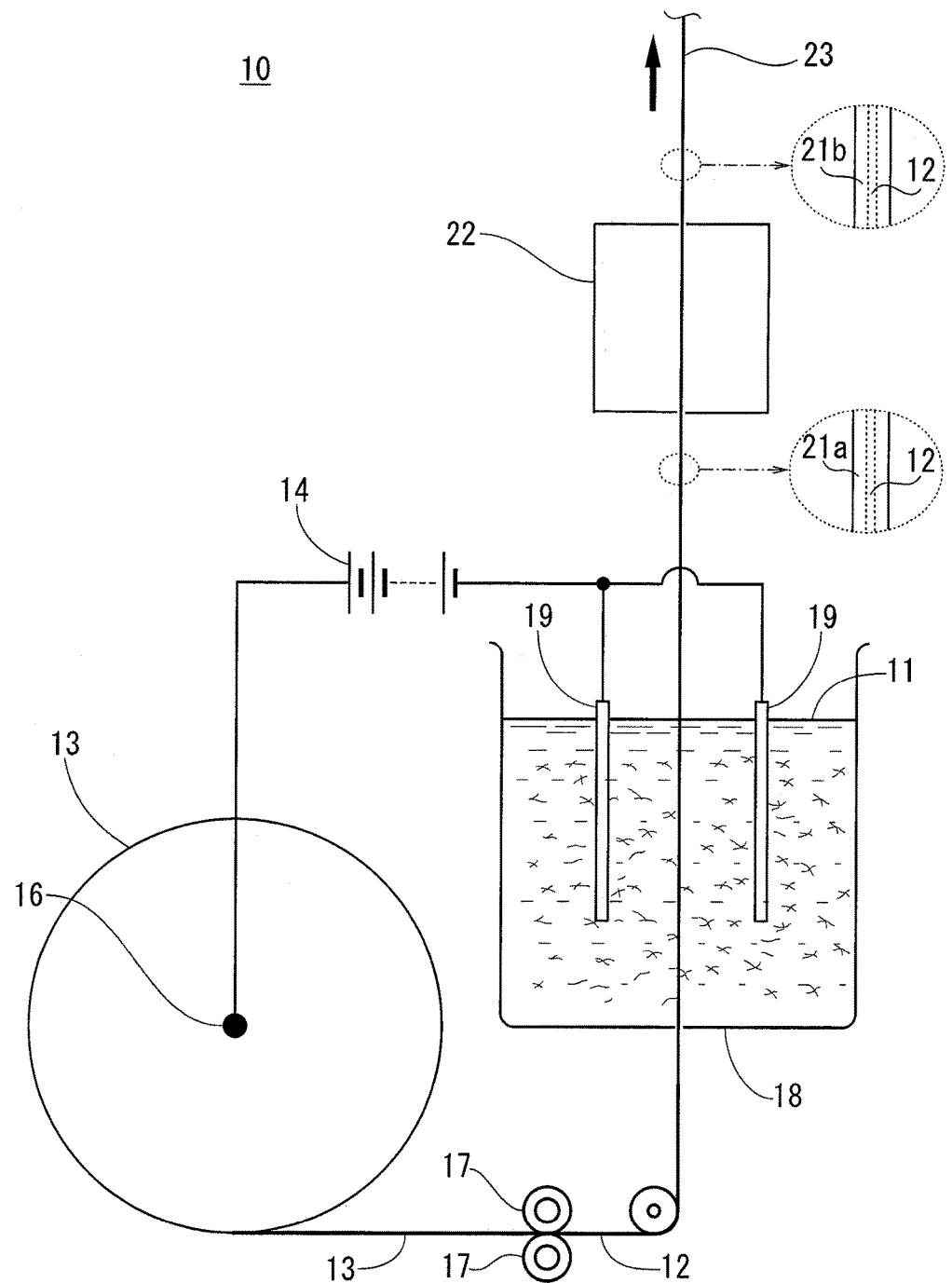

WATER-DISPERSED ELECTRODEPOSITION SOLUTION FOR FORMING INSULATING FILM

CROSS-REFERENCE TO RELATED PATENT APPLICATIONS

This application is a U.S. National Phase Application under 35 U.S.C. § 371 of International Patent Application No. PCT/JP2016/068367 filed on Jun. 21, 2016 and claims the benefit of Japanese Patent Applications No. 2015-133394, filed Jul. 2, 2015 and No. 2016-115966, filed Jun. 10, 2016, all of which are incorporated herein by reference in their entireties. The International Application was published in Japanese on Jan. 5, 2017 as International Publication No. WO/2017/002666 under PCT Article 21(2).

FIELD OF THE INVENTION

The present invention relates to a water-based electrodeposition dispersion for forming an insulating film, which is used in forming an insulator of the electrical insulated wire or the like by the electrodeposition method.

BACKGROUND OF THE INVENTION

Conventionally, insulators such as the electrical insulated wires or the like, in which the surface of the electrical wire is coated by an insulating film, are used for motors, reactors, transformers and the like. As a method for forming an insulating film on the surface of the electric wire, a dipping method, an electrodeposition method (electrodeposition coating), and the like are known. In the dipping method, for example, a rectangular conductor or the like is used as the object to be coated. By repeating a process in which the object is dipped in a coating material, pulled up, and then dried, an insulating film having an intended film thickness is formed. The electrodeposition method is a method, in which an insulating film is formed by applying direct current to: an object to be coated, which is dipped in an electrodeposition coating material (electrodeposition dispersion), and an electrode inserted into the electrodeposition coating material, to allow charged coating material particles to be precipitated on the side of the object to be coated.

The electrodeposition method draws attention because: it is easier to coat with a uniform film thickness than other methods; and an insulating film having high rust prevention ability and adhesiveness after baking can be formed. Examples of the electrodeposition dispersion used in the electrodeposition method include a polyamide acid-base mixture made of a dispersion layer of particulate polyamic acid (polyamic acid), which is a reaction product between organic diamine and chloroformyl phthalic anhydride (trimellitic anhydride chloride), and a solvent layer of water and a neutral organic solvent; and the like (see Japanese Unexamined Patent Application, First Publication No. S49-52252 (A)), for example). According to the polyamide acid-base mixture disclosed in Japanese Unexamined Patent Application, First Publication No. S49-52252 (A), if it is kept at a temperature of about 45° C. or less, it is possible to obtain storage stability of 6 months or more. In addition, the mixture can be converted to a polyamide imide film by applying to electrodepositing suitably in a continuous manner.

Technical Problem

However, in the electrodeposition dispersion (polyamide acid-base mixture) disclosed in Japanese Unexamined Patent Application, First Publication No. S49-52252 (A), the electrodeposition dispersion is obtained by pouring the product mixture of the organic diamine, chloroformyl phthalic anhydride and the like in a poor solvent such as methanol or the like to be micronized in order to disperse the polyamic acid particles in a solvent including water or the like. Therefore, in this electrodeposition dispersion, the average particle diameter of the polyamic acid particles as the polymer particles is as extremely large as 20-100 μm, and the dispersibility of the polymer particles contained in the electrodeposition dispersion becomes poor. When an insulating film is formed using an electrodeposition dispersion having poor dispersibility of polymer particles, there are cases in which variations are made in the characteristics of the insulating film formed and the insulator including the film.

With respect to the dispersibility of the polymer particles in such an electrodeposition dispersion, for example, as long as polymer particles made of a polymer other than polyamic acid are used, it is known that dispersibility can be improved by using a method, in which a basic compound is added in a solution state, the anionic group in the resin constituting the polymer particles is neutralized further, and adding water in stirring vigorously, or the like. However, in the electrodeposition dispersion using polymer particles made of polyamic acid (hereinafter referred to as polyamic acid particles), dispersibility is not stabilized sufficiently. As a result, problems such as gelling of the synthesized resin, and not being able to obtain an electrodeposition dispersion, in which polymer particles having the same average particle diameter are dispersed stably, occur. Although addition of a large amount of a basic compound can improve the dispersibility to some extent, a large amount of basic compound remains in the electrodepositing solution. Thus, electrodeposited resin mass per unit charge (coulombic efficiency) in depositing the insulating film by the electric deposition method is reduced to deteriorate productivity of insulators.

An object of the present invention is to provide an electrodeposition dispersion for forming an insulating film, in which dispersibility of polymer particles in the electrodeposition dispersion is significantly improved without reducing the coulombic efficiency in electrodeposition in an electrodepositing solution using polyamic acid particles as polymer particles.

SUMMARY OF THE INVENTION

Solution to Problem

The first aspect of the present invention is a water-based electrodeposition dispersion for forming an insulating film including: polymer particles; an organic solvent; a basic compound; and water, wherein the polymer particles include polyamic acid having at least one of structural units represented by a chemical formulae (1-1) and a chemical formula (1-2) below where R represent an aromatic hydrocarbon, and a volume-based median diameter ($D_{50}$) of the polymer particles is 0.08 μm to 0.7 μm.

[Chemical formula 1]

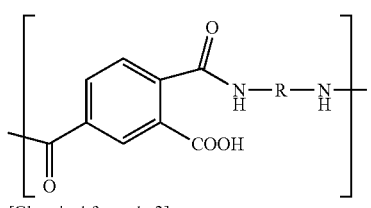

(1-1)

[Chemical formula 2]

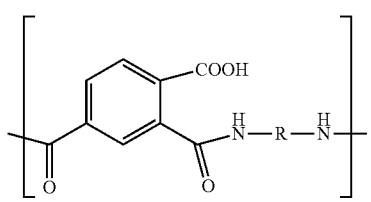

(1-2)

R represent an aromatic hydrocarbon in the chemical formulae (1-1) and (1-2).

The second aspect of the present invention is the water-based electrodeposition dispersion for forming an insulating film according to the first aspect of the present invention, wherein the volume-based median diameter ($D_{50}$) of the polymer particles is 0.1 μm to 0.55 μm.

The third aspect of the present invention is the water-based electrodeposition dispersion for forming an insulating film according to the first or second aspect of the present invention, wherein the polyamic acid has a carboxyl group at an end of the polyamic acid.

The fourth aspect of the present invention is the water-based electrodeposition dispersion for forming an insulating film according to any one of the first to third aspects of the present invention, wherein the basic compound is included in a ratio of 0.5 to 3 parts by mass with respect to 100 parts by mass of the polyamic acid.

The fifth aspect of the present invention is the water-based electrodeposition dispersion for forming an insulating film according to any one of the first to fourth aspects of the present invention, wherein a coulombic efficiency in electrodeposition is 20 mg/C or more.

The sixth aspect of the present invention is a method of producing a water-based electrodeposition dispersion for forming an insulating film including the steps of: obtaining a first reaction mixture by adding trimellitic anhydride chloride and an organic solvent to an aromatic diamine to be mixed and by reacting the aromatic diamine with the trimellitic anhydride; obtaining a second reaction mixture by further adding trimellitic anhydride chloride to the first reaction mixture and by reacting the first reaction mixture with the further-added trimellitic anhydride chloride; precipitating a polyamic acid by adding the second reaction mixture to a mixed solution of water and alcohol; and obtaining a mixed liquid by mixing the precipitated polyamic acid, an organic solvent and a basic compound; obtaining an electrodeposition dispersion by adding water to the mixed liquid.

The seventh aspect of the present invention is a method of producing an insulator including a step of forming an insulating film on a metal surface by using the water-based electrodeposition dispersion for forming an insulating film according to any one of the first to fifth aspects of the present invention.

Advantageous Effects of Invention

The water-based electrodeposition dispersion for forming an insulating film (hereinafter referred to as "the water-based electrodeposition dispersion for forming an insulating film of the present invention") according to the first and second aspects of the present invention includes: an organic solvent; a basic compound; and water, wherein the polymer particles include polyamic acid having at least one of structural units represented by a chemical formula (1-1) and a chemical formula (1-2) above, and a volume-based median diameter ($D_{50}$) of the polymer particles is controlled to predetermined very narrow ranges. As a result, it is possible to obtain very excellent dispersibility, which has been conventionally difficult to achieve with an electrodeposition dispersion using polyamic acid particles. In this electrodeposition dispersion, excellent dispersibility is achieved by controlling the particle size of the polymer particles, not by the conventional method of adding an excessive base. Therefore, when the insulating film is formed by the electrodeposition method, decrease in productivity can be suppressed without significantly lowering the coulombic efficiency.

In the water-based electrodeposition dispersion for forming an insulating film according to the third aspect of the present invention (hereinafter referred to as "the water-dispersed electrodepositing solution for forming an insulating film of the present invention"), the end of the polyamic acid constituting the polymer particles is a carboxyl group. Thus, dispersibility is further enhanced by the electrical repulsion of the anionic COO— group.

In the water-dispersed electrodepositing solution for forming an insulating film (hereinafter referred to as "the water-dispersed electrodepositing solution for forming an insulating film of the present invention") according to the fourth aspect of the present invention, the basic compound is included in a ratio of 0.5 to 3 parts by mass with respect to 100 parts by mass of the polyamic acid. For this reason, in this electrodeposition dispersion, as described above, by controlling the polymer particles to a very narrow particle size, excellent dispersibility is reliably obtained so that the basic compound can be used in a low amount and the coulombic efficiency in electrodeposition is not reduced significantly.

In the water-based electrodeposition dispersion for forming an insulating film of the fifth aspect of the present invention (hereinafter referred to as "the water-dispersed electrodepositing solution for forming an insulating film of the present invention"), an extremely high coulomb efficiency of 20 mg/C or more in depositing insulating film by the electrodeposition method can be achieved. When the coulombic efficiency in electrodeposition is high, the film can be formed with a small amount of electricity, so that high productivity can be maintained.

The method of producing a water-based electrodeposition dispersion for forming an insulating film according to the sixth aspect of the present invention (hereinafter referred to as "the method of producing a water-based electrodeposition dispersion for forming an insulating film of the present invention") includes the steps of: obtaining a first reaction mixture by adding trimellitic anhydride chloride and an organic solvent to an aromatic diamine to be mixed and by reacting the aromatic diamine with the trimellitic anhydride; obtaining a second reaction mixture by further adding trimellitic anhydride chloride to the first reaction mixture and by reacting the first reaction mixture with the further-added trimellitic anhydride chloride; precipitating a polyamic acid by adding the second reaction mixture to a mixed solution of water and alcohol; and obtaining a mixture by mixing the precipitated polyamic acid, an organic solvent and a basic compound; obtaining an electrodeposition dispersion by adding water to the mixed liquid. Because of this, it is possible to prepare a water-based electrodeposition dispersion for forming an insulating film, which greatly improves dispersibility of the polymer particles contained in the electrodepositing solution without reducing the coulombic efficiency in electrodeposition.

The method of producing an insulator according to the seventh aspect of the present invention (hereinafter referred to as "the method of producing an insulator of the present invention") includes the step of forming an insulating film on a metal surface by using the above-described water-based electrodeposition dispersion for forming an insulating film of the present invention. Therefore, it is possible to form an insulating film with less variation in characteristics with high productivity.

BRIEF DESCRIPTION OF THE DRAWING

The FIGURE is a diagram schematically showing an electrodeposition coating apparatus according to an embodiment of the present invention.

DETAILED DESCRIPTION OF THE INVENTION

Embodiments for carrying out the present invention will be described in reference to the drawings below. The water-based electrodeposition dispersion for forming an insulating film of the present invention contains: polymer particles, an organic solvent and water. The polymer particles are composed of polyamic acid which is a polymer. Polyamic acid is superior to other polymers in that it has a large number of carboxyl groups contributing to the charging of the resin in its molecular structure as compared with other polymers. Then, the polymer particles are controlled to have very small particle diameters satisfying the volume-based median diameter ($D_{50}$) of 0.08 μm to 0.7 μm, preferably 0.1 μm to 0.55 μm. The reason why the volume-based median diameter ($D_{50}$) of the polymer particles is limited to the predetermined range is that when it exceeds the upper limit value, excellent dispersibility cannot be obtained in the electrodepositing solution; storage stability deteriorates; precipitation occurs; and gelation and the like occur. On the other hand, if it is less than the lower limit value, productivity of an insulator such as an enameled wire or the like is deteriorated since it cannot be obtained unless a large amount of a basic compound is added. Among them, it is more preferable that the volume-based median diameter ($D_{50}$) of the polymer particles is 0.15 to 0.5 μm. In the present specification, the polymer particles made of polyamic acid include those in which a solvent, water, or the like is included in a particle in addition to the polyamic acid for the particle to be swollen by including them.

In the present invention, the polyamic acid constituting the polymer particles is a reaction product (resin) obtained by polymerizing an aromatic diamine as a monomer and trimellitic anhydride chloride. The aromatic diamine used in the polymerization reaction of the polyamic acid is represented by the following formula (2).

$$NH_2—R—NH_2 \quad (2)$$

In the chemical formula (2), R represents an aromatic hydrocarbon. The same applies to other equations described later other than the chemical formula (2).

Specific examples of the aromatic diamine represented by the above chemical formula (2) include 4,4'-diaminodiphenylmethane, 4,4'-diaminodiphenyl ether, m-phenylenediamine, p-phenylenediamine, 1,4-diamino naphthalene, diaminodiphenyl sulfone and the like.

Also, trimellitic anhydride chloride used for polymerization reaction of polyamic acid is a compound represented by the chemical formula (3) below.

Chemical formula 3

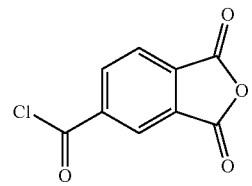

(3)

When the above-described aromatic diamine and trimellitic anhydride chloride are polymerized, a polyamic acid having at least one of the structural units represented by the chemical formulae (1-1) and (1-2) below is obtained. Specifically, examples of the polyamic acid having at least one of the structural units of the chemical formulae (1-1) and (1-2) include: 1) a polyamic acid whose basic skeleton is constituted of only a repetitive structure of the structural unit represented by the chemical formula (1-1) below; 2) a polyamic acid whose basic skeleton is constituted of only a repetitive structure of the structural unit represented by the chemical formula (1-2) below; and 3) a polyamic acid whose basic skeleton is constituted of a structure in which the structural units represented by the chemical formulae (1-1) and (1-2) are mixed. The polymerization reaction of the aromatic diamine and trimellitic anhydride chloride can be carried out by mixing them preferably in equal amounts and stirring them in an organic solvent as described later. At this time, as the organic solvent, N-methyl-2-pyrrolidone, N,N-dimethylformamide, N,N-dimethylacetamide, dimethylsulfoxide, tetramethylurea, hexaethylphosphoric triamide, γ-butyrolactam, 1,3-dimethyl-2-imidazolidinone (DMI) and the like can be used.

[Chemical formula 4]

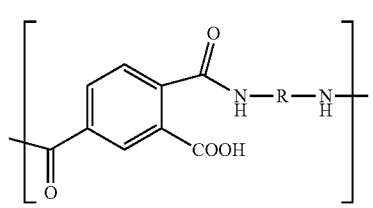

(1-1)

[Chemical formula 5]

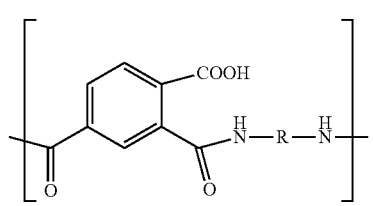

(1-2)

In the polyamic acid having at least one of the structural units of the chemical formulae (1-1) and (1-2) above, even when high-speed stirring is performed in the step of preparing the electrodeposition dispersion described below, it turns into the polyamic acid having a very large particle size of about 1 μm; or it turns into gel without dispersing to be separated. Accordingly, it becomes difficult to secure excellent dispersibility in the electrodeposition dispersion. The reason is presumably because the carboxyl group in the polyamic acid is structurally weak in acidity and hardly contributes to charge repulsion among resin particles. In the present invention, the particle size of the polymer particles is controlled to the above-mentioned very small particle diameter. In the present embodiment, control of the particle diameter can be achieved by a method, in which the carboxyl group-containing trimellitic anhydride chloride derivative is conjugated to the end of the polyamic acid having at least one of the structural units of the chemical formulae (1-1) and (1-2) above (aromatic diamine component constituting the structural unit located at the end of the basic skeleton) through the intermediate product described later. A clear technical reasoning why the particle diameter of the polyamic acid can be controlled to a small particle diameter by this method has not been understood yet by now. However, when the above-described derivative is forcibly introduced to the end of the polyamic acid, the finally obtained polymer has a structure having a carboxyl group at the end of the molecule structure. Thus, one of the technical reason would be assumed that the terminal carboxyl groups mutually cause charge repulsion especially in the step of preparing the electrodeposition dispersion, thereby preventing aggregation of the polymer particles.

The method of introducing carboxyl group-containing trimellitic anhydride chloride derivative to the end of the polyamic acid having at least one of the structural units of the formulae (1-1) or (1-2) above is as follows. First, a polyamic acid having at least one of structural units of the formulae (1-1) and (1-2) above is synthesized, and then, trimellitic anhydride chloride is further added for additionally-added trimellitic anhydride chloride to be conjugated to the end of the polyamic acid. Thereby, an intermediate product including the structures of the following formulae (4-1') to (7-1B') or (4-2') to (7-2B') are obtained. In the formulae (4-1') to (7-1B') and (4-2') to (7-2B'), "*₂" is conjugated to the basic skeleton (remaining part excluding the structural unit located at the end of the basic skeleton shown in each of chemical formulae) of the polyamic acid shown in the above-described first to third examples.

[Chemical formula 6]

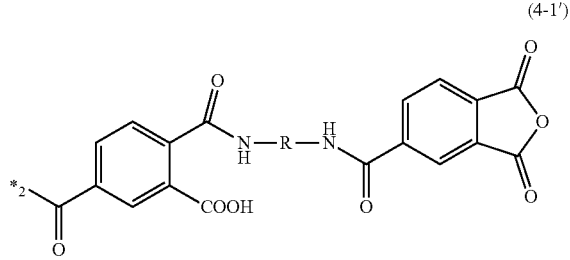

(4-1')

[Chemical formula 7]

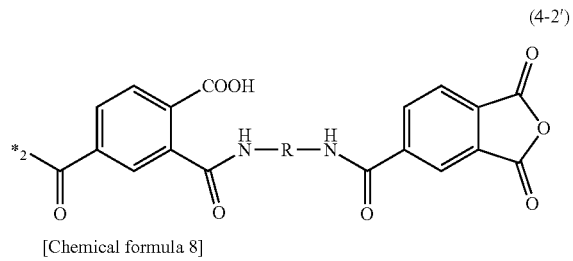

(4-2')

[Chemical formula 8]

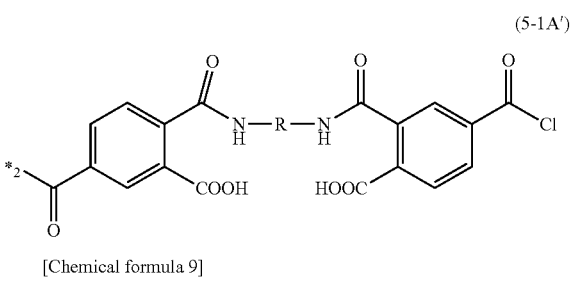

(5-1A')

[Chemical formula 9]

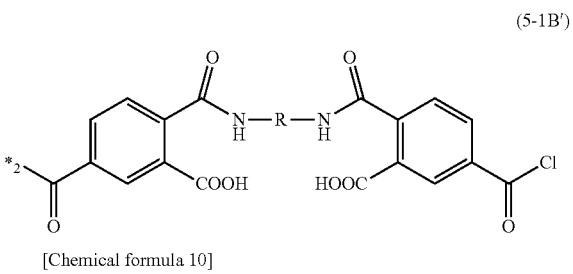

(5-1B')

[Chemical formula 10]

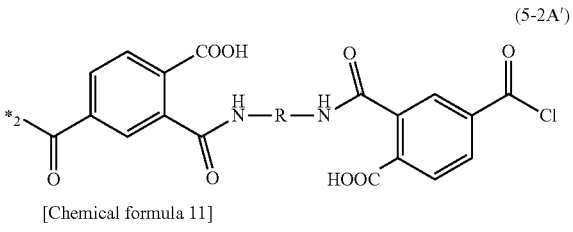

(5-2A')

[Chemical formula 11]

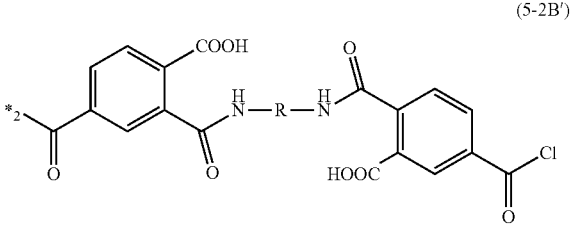

(5-2B')

[Chemical formula 12]

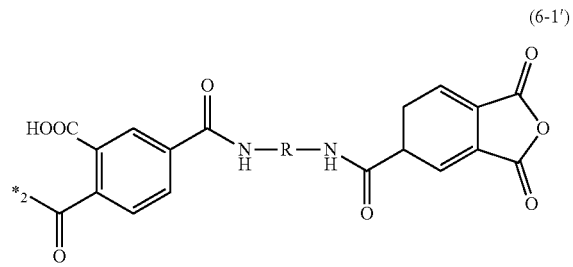

(6-1')

[Chemical formula 13]

(6-2′)

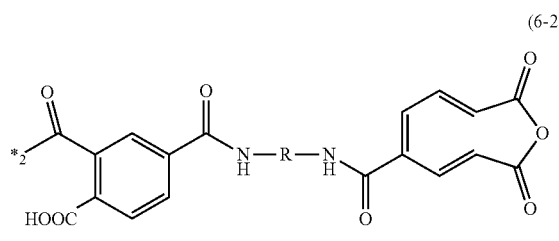

[Chemical formula 14]

(7-1A′)

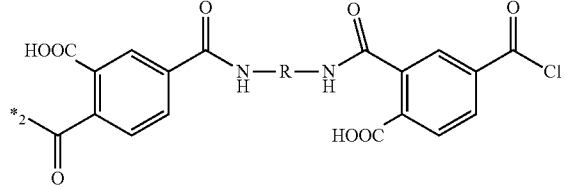

[Chemical formula 15]

(7-1B′)

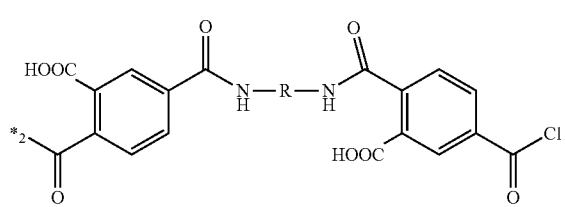

[Chemical formula 16]

(7-2A′)

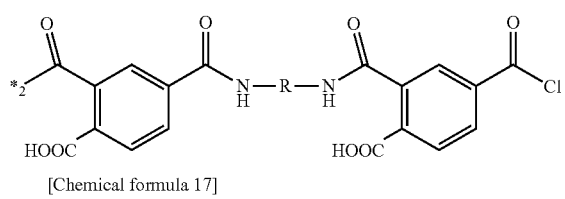

[Chemical formula 17]

(7-2B′)

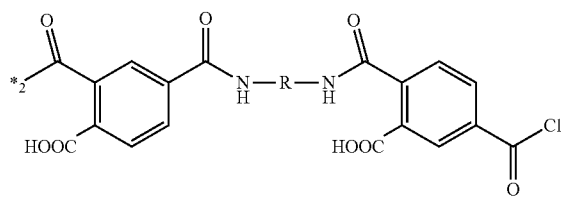

Then, by reacting water (H₂O) with the intermediate product containing the structures of the formulae (4-1′) to (7-1B′) and formulae (4-2′) to (7-2B′) above, these intermediate products become polyamic acids containing the structures of the formulae (4-1) to (7-1B) or (4-2) to (7-2B) below. In the formulae (4-1) to (7-1B) and (4-2) to (7-2B), "*₂" is conjugated to the basic skeleton (remaining part excluding the structural unit located at the end of the basic skeleton shown in each of chemical formulae) of the polyamic acid shown in the above-described first to third examples.

[Chemical formula 18]

(4-1)

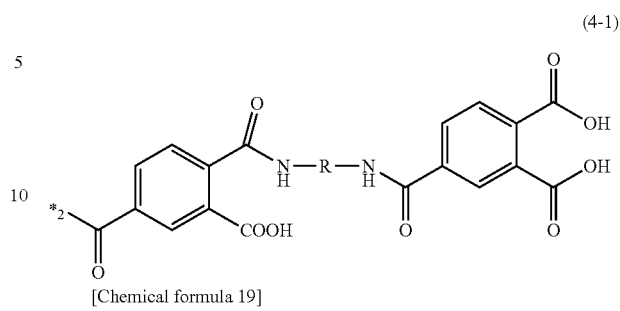

[Chemical formula 19]

(5-1A)

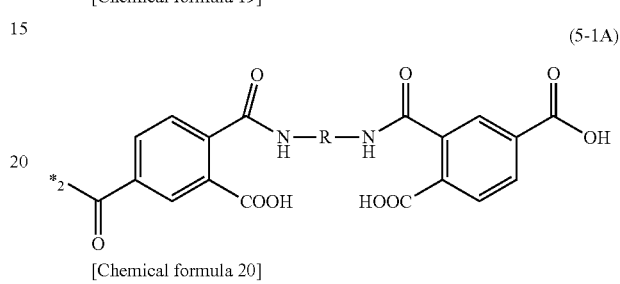

[Chemical formula 20]

(5-1B)

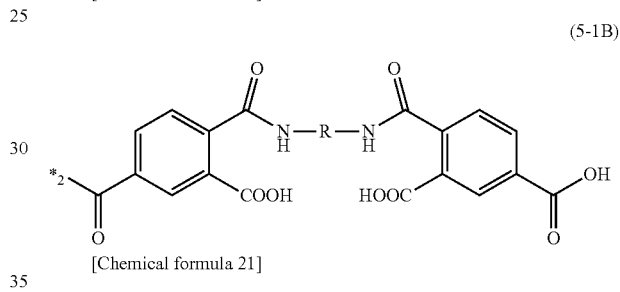

[Chemical formula 21]

(6-1)

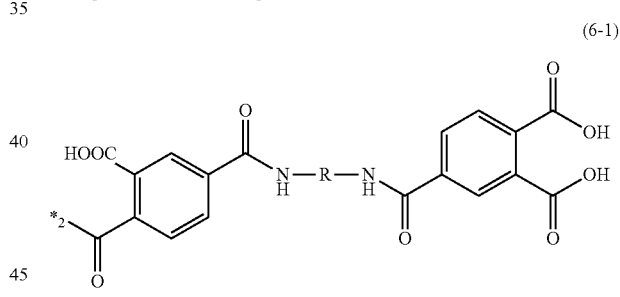

[Chemical formula 22]

(7-1A)

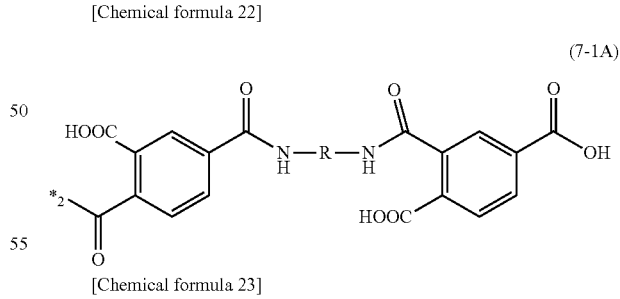

[Chemical formula 23]

(7-1B)

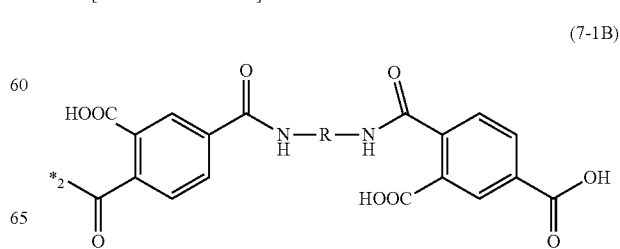

-continued

[Chemical formula 24]

(4-2)

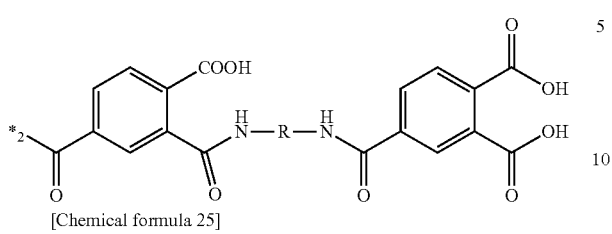

[Chemical formula 25]

(5-2A)

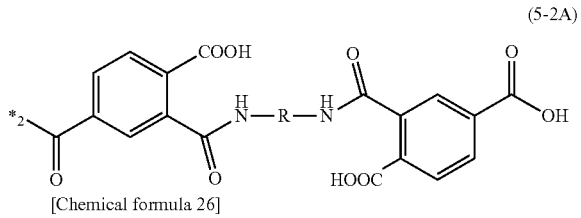

[Chemical formula 26]

(5-2B)

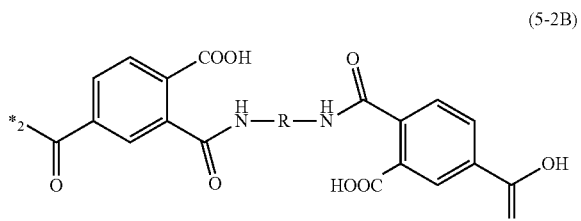

[Chemical formula 27]

(6-2)

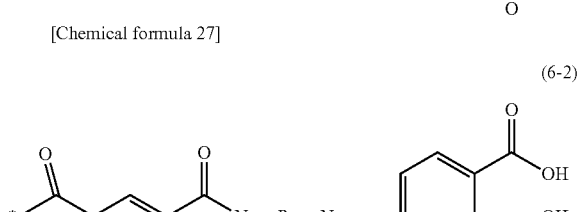

[Chemical formula 28]

(7-2A)

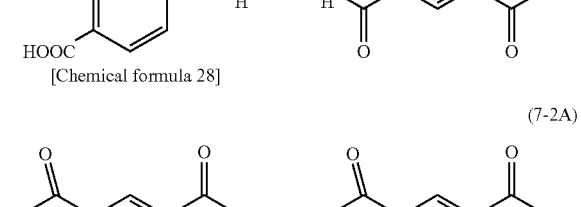

[Chemical formula 29]

(7-2B)

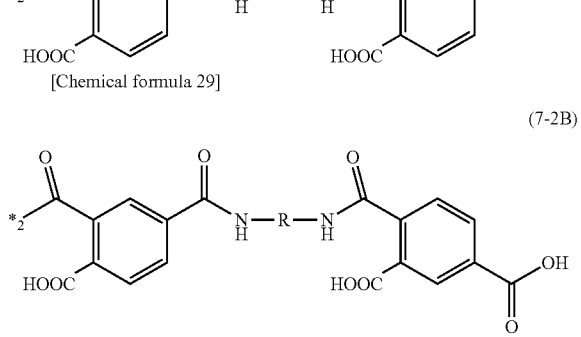

In this way, a trimellitic anhydride chloride derivative containing a carboxyl group is introduced into the end of the polyamic acid having at least one of the structural units of the chemical formulae (1-1) and (1-2) above. That is, the carboxyl group-containing trimellitic anhydride chloride derivative represented by the chemical formulae (A) to (C) below is introduced into the aromatic diamine component constituting the structural unit of the chemical formula (1-1) or (1-2) above located at the end of the basic skeleton. "*₁" is conjugated to the end of the polyamic acid having at least one of the structural units of the chemical formulae (1-1) and (1-2) above in the chemical formulae (A) to (C).

[Chemical formula 30]

(A)

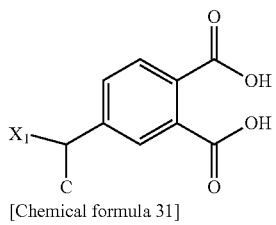

[Chemical formula 31]

(B)

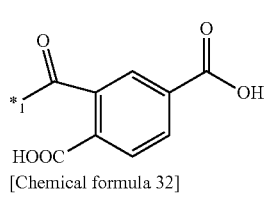

[Chemical formula 32]

(C)

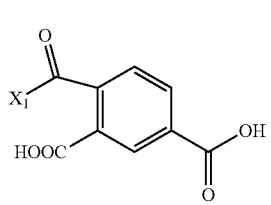

Because of this, the polyamic acid obtained as the final product becomes the polyamic acid containing a carboxyl group (—COOH) at its end as shown in the chemical formulae (4-1) to (7-1B) and (4-2) to (7-2B) above. That is, a carboxyl group derived from the above-described derivative is newly introduced into the end of the polymeric structure of the polyamic acid obtained as the final product. Proton is eliminated by the addition of a basic compound in a part or all of the introduced terminal carboxyl groups (—COOH), and easily converts to a carboxylate ion (—COOO⁻).

It is preferable that the polyamic acid constituting the polymer particles in the electrodeposition dispersion has a molecular weight that is sufficiently high since it allow to form an insulating film with very excellent film characteristics such as insulation property and heat resistance. Specifically, the weight average molecular weight is preferably from 30,000 to 300,000, more preferably from 30,000 to 60,000. If the weight average molecular weight is less than the lower limit value, the film properties (insulating properties, heat resistance, etc.) of the insulating film to be formed may be deteriorated in some cases. On the other hand, since the activity of the reaction decreases as the molecular weight increases in the polyamic acid formation reaction, it is difficult to produce what exceeds the upper limit value at present. The molecular weight can be appropriately adjusted within the range that can be controlled by the present condition by adjusting conditions such as reaction time.

Specifically, such a polyamic acid can be obtained by the following method and procedure. As the monomer, the above-mentioned aromatic diamine and trimellitic anhydride chloride are prepared. First, the above-described aromatic diamine and an organic solvent such as N,N'-dimethylacetamide are charged into a flask, and these are stirred and dissolved. In the flask, it is preferable to use a separable flask equipped with a stirrer, a three-way cock for introducing atmospheric gas, a thermocouple and the like.

Next, the first reaction mixture is obtained by: adding trimellitic anhydride chloride to the flask together with an organic solvent; introducing an atmosphere gas such as argon gas into the flask; and stirring the contents in the flask to react preferably at a temperature of 20 to 30° C. for 4 to 24 hours. At this time, the mixing ratio of the aromatic diamine and the trimellitic anhydride chloride is preferably such that the molar ratio (aromatic diamine: trimellitic anhydride chloride) is 1:0.9 to 1.1, more preferably 1.0:1.0. This is because when these compounding ratios are unbalanced, it becomes difficult to form a polymer having a sufficiently high molecular weight. The amount of the organic solvent to be used is preferably adjusted so that the resin obtained after the reaction is contained in the organic solvent in a proportion of 10 to 30% by mass. The atmospheric gas to be introduced into the flask is not limited to the argon gas but may be an inert gas such as a nitrogen gas.

Thereafter, the second reaction mixture is obtained by: additionally adding trimellitic anhydride chloride to the first reaction mixture in the flask; and further stirring the contents in the flask to react preferably at a temperature of 20 to 30° C. for 0.5 to 3 hours. At this time, the proportion of trimellitic anhydride chloride to be additionally added is preferably adjusted to 0.05 to 1 mole relative to 1 mole of trimellitic anhydride chloride initially added. The reason why trimellitic anhydride chloride is added in two stages as described above is that when more trimellitic anhydride chloride is added at the stage of preparing the first reaction mixture, it becomes difficult to control the molecular weight of the polyamic acid constituting the polymer particles to an intended size.

Next, water and alcohol are charged into the beaker at a ratio such that the mass of water is 1 to 3 with respect to the mass of alcohol, and a mixed solution of water and alcohol is prepared. As the alcohol, methanol, ethanol, propanol, isopropyl alcohol and the like can be mentioned, and it is preferable to use one kind or two or more kinds thereof. Then, the prepared second reaction mixture solution is dropped into the mixed solution using a pipette or the like. In this way, polyamic acid in a powder form is precipitated in the mixed solution. Next, the precipitated powdery polyamic acid is collected by suction filtration while washing with alcohol or the like, and then dried by natural drying or the like. Through the above steps, the polyamic acid explained above can be obtained.

In order to prepare the water-based electrodeposition dispersion for forming an insulating film using the above-described polyamic acid, firstly, the polyamic acid obtained as described above is dissolved in an organic solvent, and then a poor solvent such as 1-methoxypropanol and a basic compound are added and the mixture is mixed thoroughly by stirring to be a mixed solution. Then, water is added dropwise while stirring the mixture at room temperature, preferably at a high rotational speed of 8,000 to 12,000 rpm. As a result, the polyamic acid is precipitated in the solution, and a white electrodepositing solution in which fine polymer particles made of polyamic acid are dispersed is obtained.

As the organic solvent, N-methyl-2-pyrrolidone, N,N-dimethylformamide, N,N-dimethylacetamide, dimethylsulfoxide, tetramethylurea, hexaethylphosphoric triamide, γ-butyrolactam, 1,3-2-imidazolidinone (DMI) and the like can be used. As the poor solvent; aliphatic alcohols such as 1-propanol and isopropyl alcohol; ethylene glycols such as 2-methoxyethanol; propylene glycols such as 1-methoxy-2-propanol; and the like can be used. As the basic compound, amines such as 2-aminoethanol, 2-acetamidoethanol, triethylamine, tripropylamine, triethanolamine, and ammonia; a nitrogen-containing heterocyclic compound such as pyrrole, pyridine, and piperidine; and the like can be used. A preferable ratio of each component in the electrodepositing solution is, Polyamic acid (polymer particles)/Organic solvent/Water/Basic compound/Poor solvent=1-10 mass %/30-70 mass %/Balance/0.005-0.3 mass %/10-20 mass %. The proportion of the basic compound is preferably 0.5 to 3 parts by mass with respect to 100 parts by mass of the polyamic acid (polymer particles) in the electrodepositing solution. If the proportion of the basic compound to the polyamic acid is too small, the particle size of the polymer particle becomes coarse or the polymer gels and may not be sufficiently dispersed in some cases. If the proportion of the basic compound is too large, the problem such as the reduction of the coulombic efficiency and the like would occur. Through the above-described steps, the water-based electrodeposition dispersion for forming an insulating film including polyamic acid is obtained. In the water-based electrodeposition dispersion, polymer particles having a predetermined median diameter ($D_{50}$) are dispersed.

Production of Insulator

Next, a method of producing an insulator, in which an insulating film is formed on the metal surface by using the above-described water-based electrodeposition dispersion for forming an insulating film, is explained as example of a method of producing an electrical insulated wire, on the surface of which an insulating film is formed, based on drawings. As shown in FIG. 1, the electrodepositing solution 11 is electrodeposited on the surface of the electric wire 12 by the electrodeposition coating method using the electrodeposition coating apparatus 10 to form the insulating layer 21a. Specifically, a columnar electric wire 13 having a circular cross section wound in a cylindrical shape in advance is electrically connected to the positive electrode of the DC power supply 14 via the anode 16. Then, the cylindrical electric wire 13 is pulled up in the direction of the solid arrow in FIG. 1 and subjected to the following steps.

First, as the first step, the cylindrical electric wire 13 is flattened by a pair of rolling rollers 17, 17 to form the rectangular electric wire 12 having a rectangular cross section. Examples of the electric wire includes: copper wire; aluminum wire; steel wire; copper alloy wire; aluminum alloy wire; and the like. Subsequently, as the second step, the electrodeposition dispersion 11 is stored in the electrodeposition bath 18, preferably maintained at a temperature of 5° C. to 60° C., and the rectangular shaped electric wire 12 is passed through the electrodeposition dispersion 11 in the electrodeposition bath 18. The cathode 19, which is electrically connected to the negative electrode of the direct current power source 14, is inserted in the electrodeposition dispersion 11 in the electrodeposition bath 18 spaced apart from the rectangular electric wire 12 passing therethrough the solution. When the rectangular electric wire 12 passes through the electrodeposition dispersion 11 in the electrodeposition bath 18, a DC voltage is applied between the rectangular electric wire 12 and the cathode 19 by the direct current power supply 14. In this case, the DC voltage of the direct current power source 14 is preferably 1V to 300V, and the duration of energization of the direct current is preferably 0.01 second to 30 seconds. As a result, negatively charged polymer particles (not shown) are electrodeposited on the surface of the rectangular electric wire 12 to form the insulating layer 21a in the electrodeposition dispersion 11.

Next, the insulation coating 21b is formed on the surface of the electric wire 12 by applying a baking treatment to the flat wire 12 having the insulating layer 21a electrodeposited on its surface. In this embodiment, the electric wire 12 having the insulating layer 21a formed on its surface is passed through the interior of the baking oven 22. The baking treatment is preferably performed by a near infrared heating furnace, a hot air heating furnace, an induction heating furnace, a far infrared heating furnace, or the like. The temperature of the baking treatment is preferably in the range of 250° C. to 500° C., and the time of the baking treatment is preferably in the range of 1 minute to 10 minutes. The temperature of the baking process is the temperature of the center portion in the baking furnace. By passing through the baking furnace 22, the insulated electric wire 23 in which the surface of the electric wire 12 is covered with the insulating film 21b is produced.

EXAMPLES

Next, Examples of the present invention will be described in detail below together with Comparative Examples.

Example 1

First, 3.00 g (15 mmol) of 4,4'-diaminodiphenyl ether and 45 g of N,N-dimethylacetamide (DMAc) were placed in a separable flask equipped with a stirrer, a three-way cock for introducing argon and a thermoelectric and dissolved by stirring. Next, 3.16 g (15 mmol) of trimellitic anhydride chloride and 15 g of DMAc were added to the above-described flask, and the content in the flask was stirred at room temperature (25° C.) for 6 hours in an argon gas atmosphere to react for the first reaction mixture to be prepared.

Thereafter, 0.32 g (1.5 mmol) of trimellitic anhydride chloride was additionally added to the first reaction mixture in the flask and stirred for further 1 hour to react to prepare the second reaction mixture.

Next, water and alcohol were charged into the beaker at a mass ratio of 3:1 and vigorously stirred to prepare a mixed solution. To the mixed solution (800 ml), the prepared second reaction mixture was added dropwise to precipitate polyamic acid. Subsequently, the precipitated polyamic acid was recovered by suction filtration while washing with alcohol, and then dried. The polyamic acid synthesized in this way was identified by FT-IR (Fourier Transform Infrared Spectroscopy).

Next, 0.5 g of the polyamic acid obtained as described above was dissolved in 5 g of N-methyl-2-pyrrolidone (organic solvent), then 1.5 g of 1-methoxypropanol (poor solvent), 2 g of 2-aminoethanol (basic compound) were added to the dissolved polyamic acid; and the mixture was stirred sufficiently. By adding water dropwise to the mixed solution while stirring the mixture at high speed at 10,000 rpm, 10.0 g of a white electrodeposition dispersion in which fine polyamic acid particles were dispersed was obtained.

Subsequently, an insulator was produced using the electrodeposition dispersion prepared as described above. Specifically, first, the electrodeposition dispersion was stored in an electrodeposition bath, and the temperature of the electrodeposition dispersion in this electrodeposition bath was set to 25° C. Subsequently, a copper plate having a square of 18 mm and a thickness of 0.3 mm (anode) and a stainless steel plate having a square of 3 cm (cathode) facing each other were installed in the electrodeposition dispersion in the electrodeposition bath, and held for 30 seconds in a state where a DC voltage of 20V was applied between the copper plate and the stainless steel plate. As a result, an insulating layer was formed on the surface of the copper plate.

Next, the copper plate on which the insulating layer was formed on the surface was baked. Specifically, the copper plate on which the insulating layer was formed was held in a baking furnace maintained at a temperature of 250° C. for 3 minutes. As a result, an insulator having an insulating film on the surface of the copper plate was obtained. The temperature inside the baking furnace was the temperature in the center portion in the furnace measured with a thermocouple.

Example 2

An electrodeposition dispersion was obtained as in Example 1, except for the addition amount of the 2-aminoethanol being changed to 0.015 g. By using the electrodeposition dispersion, an insulator was produced in the same method and condition as Example 1.

Example 3

An electrodeposition dispersion was obtained as in Example 1, except for the addition amount of the 2-aminoethanol being changed to 0.005 g. By using the electrodeposition dispersion, an insulator was produced in the same method and condition as Example 1.

Example 4

An electrodeposition dispersion was obtained as in Example 1, except for the addition amount of the 2-aminoethanol being changed to 0.0075 g. By using the electrodeposition dispersion, an insulator was produced in the same method and condition as Example 1.

Example 5

An electrodeposition dispersion was obtained as in Example 1, except for the addition amount of the 2-aminoethanol being changed to 0.0125 g. By using the electrodeposition dispersion, an insulator was produced in the same method and condition as Example 1.

Example 6

An electrodeposition dispersion was obtained as in Example 1, except for the first reaction time between 4,4'-diaminodiphenyl ether and trimellitic anhydride chloride being changed to 4 hours. By using the electrodeposition dispersion, an insulator was produced in the same method and condition as Example 1.

Example 7

An electrodeposition dispersion was obtained as in Example 1, except for the first reaction time between 4,4'-diaminodiphenyl ether and trimellitic anhydride chloride being changed to 24 hours. By using the electrodeposition dispersion, an insulator was produced in the same method and condition as Example 1.

Example 8

An electrodeposition dispersion was obtained as in Example 1, except for the addition amount of the 2-aminoethanol being changed to 0.08 g. By using the electrodeposition dispersion, an insulator was produced in the same method and condition as Example 1.

Example 9

An electrodeposition dispersion was obtained as in Example 1, except for the addition amount of the 2-aminoethanol being changed to 0.35 g. By using the electrodeposition dispersion, an insulator was produced in the same method and condition as Example 1.

Comparative Example 1

A reaction solution of polyamic acid obtained as in Example 1 was added to alcohol dropwise to precipitate polyamic acid. By using the precipitated polyamic acid, an electrodeposition dispersion was obtained as in Example 1. In addition, by using the electrodeposition dispersion, an insulator was produced in the same method and condition as Example 1.

Comparative Example 2

An electrodeposition dispersion was obtained as in Example 1, except for the addition amount of the 2-aminoethanol being changed to 0.02 g. By using the electrodeposition dispersion, an insulator was produced in the same method and condition as Example 1.

Comparative Example 3

An electrodeposition dispersion was obtained as in Example 1, except for not performing the additional adding of the trimellitic anhydride chloride in synthesis of polyamic acid. In Comparative Example 3, the polymer particles were not sufficiently dispersed in the preparation stage of the electrodeposition dispersion, and the electrodeposition dispersion could not be obtained because precipitation occurred.

Comparative Test and Evaluation

The electrodeposition dispersions obtained in Examples 1 to 9 and Comparative Examples 1 to 3 were evaluated as described following (i) to (iv). These results are shown in Table 1 below.

(i) Median diameter ($D_{50}$): By using the dynamic light-scattering particle size analyzer (Model: LB-550 manufactured by Horiba, Ltd.) the volume-based median diameter ($D_{50}$) in each of the polymer particles synthesized in Examples and Comparative Examples was measured.

(ii) Coulombic Efficiency: A value obtained by dividing the mass of the insulating layer after the baking treatment deposited on the surface of the copper plate by the above-mentioned method by the amount of electricity required at the time of electrodeposition was calculated, and was defined as the coulombic efficiency. The mass of the insulating layer after the baking treatment was calculated from the amount of change in mass between the copper plate on which the insulating layer was formed after baking treatment and the copper plate before electrodeposition. In addition, the amount of electricity required for electrodeposition was confirmed by a Coulomb meter at the time of electrodeposition.

(iii) Storage stability of dispersion: The electrodeposition dispersions prepared in the respective Examples and Comparative Examples were allowed to stand at room temperature for a certain period of time, and the presence or absence of precipitation and/or gel substance was visually confirmed. In Table 1, "A" shows a case where no sedimentation was visually observed even after one month elapse, while "B" shows a case where there was no confirmation of the presence of precipitations after a lapse of one week, but it was confirmed after one month. "C" indicates a case where precipitation was not confirmed immediately after preparation of the electrodeposition dispersion but precipitation was confirmed after one week elapsed. "D" indicates a case where precipitation was confirmed immediately after preparation of the electrodeposition dispersion.

(iv) Mass average molecular weight: Molecular weight measurement was performed by converting the measured value with a differential refractometer to a value corresponding to polystyrene by using a high-speed GPC apparatus (Model: HLC-8320 GPC manufactured by Tosoh Corporation), a column having an exclusion limit molecular weight of $4 \times 10^7$ or more (TSKgel Super AWM-H manufactured by Tosoh Corporation), The flow rate was 0.600 cc/min, the control temperature was 40° C., the sampling rate was $5 \times 10^{-3}$ cc/sec, and the sample injection amount was 0.010 cc. For the mobile phase, dimethylacetamide, to which 1 mmol of lithium bromide and 100 mmol of phosphoric acid were added as adsorption inhibitors, was used.

TABLE 1

| | Polymer particles (polyamic acid particles) | | | Organic solvent Ratio [mass %] | Water Ratio [mass %] | Poor solvent Ratio [mass %] | Ratio [mass %] | Basic compound Ratio with respect to 100 parts of polymer particles [mass parts] | Evaluation | |
|---|---|---|---|---|---|---|---|---|---|---|
| | Mass average molecular weight | $D_{50}$ [μm] | Ratio [mass %] | | | | | | Coulombic efficiency [mg/C] | Storage stability of dispersion |
| Example 1 | 36000 | 0.15 | 5 | 50 | balance | 15 | 0.1 | 2 | 29.4 | A |
| Example 2 | 36000 | 0.1 | 5 | 50 | balance | 15 | 0.15 | 3 | 20.9 | A |
| Example 3 | 36000 | 0.54 | 5 | 50 | balance | 15 | 0.05 | 1 | 63.7 | B |
| Example 4 | 36000 | 0.27 | 5 | 50 | balance | 15 | 0.075 | 1.5 | 44.5 | B |
| Example 5 | 36000 | 0.13 | 5 | 50 | balance | 15 | 0.125 | 2.5 | 27.0 | A |
| Example 6 | 30000 | 0.18 | 5 | 50 | balance | 15 | 0.1 | 2 | 29.0 | A |
| Example 7 | 60000 | 0.13 | 5 | 50 | balance | 15 | 0.1 | 2 | 28.9 | A |
| Example 8 | 36000 | 0.69 | 5 | 50 | balance | 15 | 0.04 | 0.8 | 65.1 | C |

TABLE 1-continued

| | Polymer particles (polyamic acid particles) | | | | | | Basic compound | Evaluation | |
|---|---|---|---|---|---|---|---|---|---|
| | Mass average molecular weight | $D_{50}$ [μm] | Ratio [mass %] | Organic solvent Ratio [mass %] | Water Ratio [mass %] | Poor solvent Ratio [mass %] | Ratio [mass %] | Ratio with respect to 100 parts of polymer particles [mass parts] | Coulombic efficiency [mg/C] | Storage stability of dispersion |
| Example 9 | 36000 | 0.08 | 5 | 50 | balance | 15 | 0.18 | 3.5 | 16.5 | A |
| Comparative Example 1 | 37000 | 0.85 | 5 | 50 | balance | 15 | 0.1 | 2 | 28.5 | D |
| Comparative Example 2 | 36000 | 0.07 | 5 | 50 | balance | 15 | 0.2 | 4 | 13.3 | A |
| Comparative Example 3 | 38000 | — | 5 | 50 | balance | 15 | 0.1 | 2 | — | D |

As clearly demonstrated in Table 1, in comparison with Examples 1-9 and Comparative Examples 1-3, sufficient dispersibility was not obtained in Comparative Example 1 in which the volume-based median diameter ($D_{50}$) of polymer particles exceeds the predetermined value. As a result, precipitations were formed immediately after preparation of the electrodeposition dispersion, and the storage stability of dispersion was deteriorated. In addition, in Comparative Example 2 in which the volume-based median diameter ($D_{50}$) of the polymer particles is less than the predetermined value, the coulombic efficiency of the produced insulator was severely deteriorated since a large amount of the basic compound was added. In addition, in Comparative Example 3 in which additional addition of trimellitic anhydride chloride was not performed in synthesizing polyamic acid, since an electrodeposition dispersion was not obtained as explained above. As a result, an insulator could not be produced and an evaluation of coulombic efficiency could not be performed.

On the other hand, in Examples 1-9, the particle diameter of the polymer particles was small, the dispersibility was high, the coulombic efficiency was also very high, and electrodeposition could be performed efficiently.

INDUSTRIAL APPLICABILITY

The present invention can be applied not only to the power inductor for a power supply of a personal computer, a smart phone, and the like; but to the electrical insulating wire used for the trans, reactor, motor, or the like of the inverter of an automobile or production of other insulators.

REFERENCE SIGNS LIST

11: Electrodeposition dispersion

What is claimed is:

1. A water-based electro deposition dispersion for forming an insulating film comprising:
   polymer particles;
   an organic solvent;
   a basic compound; and
   water, wherein
   the polymer particles include polyamic acid having at least one of structural units represented by a chemical formula (1-1) and a chemical formula (1-2) below where R represent an aromatic hydrocarbon,

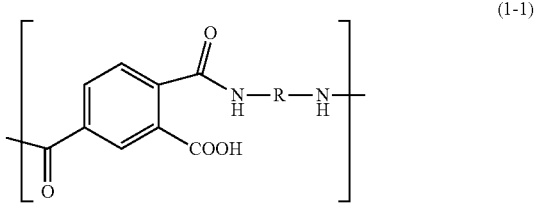

(1-1)

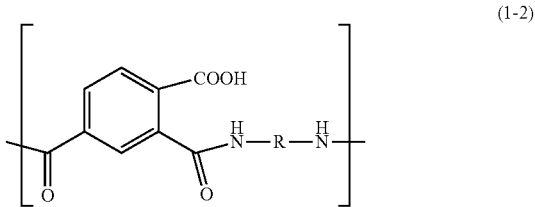

(1-2)

a volume-based median diameter ($D_{50}$) of the polymer particles is 0.08 m to 0.7 pm; and
wherein the basic compound is included in a ratio of 0.5 to 3 parts by mass with respect to 100 parts by mass of the polyamic acid.

2. The water-based electrodeposition dispersion for forming an insulating film according to claim 1, wherein the volume-based median diameter ($D_{50}$) of the polymer particles is 0.1 μm to 0.55 μm.

3. The water-based electrodeposition dispersion for forming an insulating film according to claim 1, wherein the polyamic acid has a carboxyl group at an end of the polyamic acid.

4. The water-based electrodeposition dispersion for forming an insulating film according to claim 1, wherein a coulombic efficiency in electrodeposition is 20 mg/C or more.

5. A method of producing an insulator comprising a step of forming an insulating film on a metal surface by electrodeposition by using the water-based electrodeposition dispersion for forming an insulating film according to claim 1.

6. The water-based electrodeposition dispersion for forming an insulating film according to claim 2, wherein the polyamic acid has a carboxyl group at an end of the polyamic acid.

* * * * *